(12) United States Patent
Naito (10) Patent No.: US 10,461,353 B2
(45) Date of Patent: Oct. 29, 2019

(54) FUEL CELL STACK

(71) Applicant: HONDA MOTOR CO., LTD., Tokyo (JP)

(72) Inventor: Hideharu Naito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 406 days.

(21) Appl. No.: 14/477,865

(22) Filed: Sep. 5, 2014

(65) Prior Publication Data

US 2015/0072258 A1   Mar. 12, 2015

(30) Foreign Application Priority Data

Sep. 6, 2013   (JP) ................................. 2013-185643
Jan. 16, 2014  (JP) ................................. 2014-005678

(51) Int. Cl.
| | | |
|---|---|---|
| *H01M 8/242* | (2016.01) | |
| *H01M 8/2485* | (2016.01) | |
| *H01M 8/2483* | (2016.01) | |
| *H01M 8/0267* | (2016.01) | |

(Continued)

(52) U.S. Cl.
CPC ......... *H01M 8/242* (2013.01); *H01M 8/0267* (2013.01); *H01M 8/2483* (2016.02); *H01M 8/2485* (2013.01); *H01M 8/248* (2013.01); *H01M 2008/1095* (2013.01); *H01M 2250/20* (2013.01); *Y02T 90/32* (2013.01)

(58) Field of Classification Search
CPC ............. H01M 8/2485; H01M 8/0267; H01M 8/2475; H01M 8/2484

USPC ................................................. 429/434, 458
See application file for complete search history.

(56) References Cited

U.S. PATENT DOCUMENTS

| | | | | |
|---|---|---|---|---|
| 4,623,596 A | * | 11/1986 | Kamoshita | H01M 8/2415 |
| | | | | 429/437 |
| 6,732,372 B2 | * | 5/2004 | Tomita | H04N 5/44543 |
| | | | | 348/563 |
| 2001/0018143 A1 | | 8/2001 | Okazaki | |

(Continued)

FOREIGN PATENT DOCUMENTS

| | | |
|---|---|---|
| JP | 2001-243970 | 9/2001 |
| JP | 2002-100392 | 4/2002 |

(Continued)

OTHER PUBLICATIONS

English translation of Kobayashi et al., JP2011-065869.*

(Continued)

*Primary Examiner* — Niki Bakhtiari
(74) *Attorney, Agent, or Firm* — Mori & Ward, LLP (57) ABSTRACT

A fuel cell stack includes a stack of fuel cells, a first end plate, a second end plate, a fluid manifold member, and a protrusion. In the stack of fuel cells, the fuel cells are stacked in a stacking direction. The first end plate is disposed on a first end of the stack of fuel cells in the stacking direction. The second end plate is disposed on a second end of the stack of fuel cells in the stacking direction. The fluid manifold member is disposed on at least one of the first and second end plates. The fluid manifold member allows a fluid to flow through the fuel cells. The protrusion is disposed around a joint region at which the fluid manifold member is joined to the at least one of the first and second end plates. The protrusion protrudes outward in the stacking direction.

6 Claims, 11 Drawing Sheets

(51) Int. Cl.
    *H01M 8/248*      (2016.01)
    *H01M 8/1018*     (2016.01)

(56) References Cited

U.S. PATENT DOCUMENTS

| | | | | |
|---|---|---|---|---|
| 2003/0124407 A1* | 7/2003 | Tanaka | ................ | H01M 8/0254 |
| | | | | 429/413 |
| 2008/0226964 A1* | 9/2008 | Nishiyama | .......... | H01M 8/0267 |
| | | | | 429/443 |
| 2009/0029232 A1* | 1/2009 | Petty | ..................... | H01M 8/248 |
| | | | | 429/460 |
| 2009/0274940 A1* | 11/2009 | Morita | ................ | H01M 8/0267 |
| | | | | 429/413 |
| 2013/0004876 A1* | 1/2013 | Suzuki | .............. | H01M 8/04007 |
| | | | | 429/434 |
| 2013/0140807 A1* | 6/2013 | Van Dusen | ........... | F16L 23/036 |
| | | | | 285/16 |
| 2013/0260275 A1* | 10/2013 | Ichihara | ................ | H01M 8/249 |
| | | | | 429/458 |

FOREIGN PATENT DOCUMENTS

| | | |
|---|---|---|
| JP | 2011-065869 | 3/2011 |
| WO | WO 2013/111669 | 8/2013 |

OTHER PUBLICATIONS

Japanese Office Action for corresponding JP Application No. 2014-005678, dated Dec. 20, 2016 (w/ English machine translation).

* cited by examiner

FUEL CELL STACK

CROSS-REFERENCE TO RELATED APPLICATIONS

The present application claims priority under 35 U.S.C. § 119 to Japanese Patent Application No. 2013-185643, filed Sep. 6, 2013 and Japanese Patent Application No. 2014-005678, filed Jan. 16, 2014, entitled "Fuel Cell Stack." The contents of these applications are incorporated herein by reference in their entirety.

BACKGROUND

1. Field

The present disclosure relates to a fuel cell stack.

2. Description of the Related Art

For example, a solid polymer electrolyte fuel cell includes a membrane electrode assembly (MEA), in which an anode electrode is disposed on one side of an electrolyte membrane and a cathode electrode is disposed on the other side of the electrolyte membrane. The electrolyte membrane is made from a solid polymer ion-exchange membrane. The MEA and a pair of separators, sandwiching the MEA therebetween, constitute a power generation cell. Typically, a predetermined number of such power generation cells are stacked and used, for example, as a vehicle fuel cell stack, which is mounted in a fuel cell vehicle (fuel cell electric automobile or the like).

In a fuel cell, a fuel gas channel for supplying a fuel gas to the anode electrode and an oxidant gas channel for supplying an oxidant gas to the cathode electrode are formed on surfaces of the separators. A coolant channel, through which a coolant flows, is formed between adjacent separators so as to extend in the in-plane direction of the separators.

Some fuel cells have a so-called internal manifold structure, in which a fuel gas manifold, through which a fuel gas flows, an oxidant gas manifold, through which an oxidant gas flows, and a coolant manifold, through which a coolant flows, extend through the fuel cells in the stacking direction. The fuel gas manifold has a fuel gas inlet manifold and a fuel gas outlet manifold, the oxidant gas manifold has an oxidant gas inlet manifold and an oxidant gas outlet manifold, and the coolant manifold has a coolant inlet manifold and a coolant outlet manifold.

In the aforementioned fuel cell stack, a fluid manifold member is disposed on at least one of the end plates. The fluid manifold member is connected to the fuel gas manifold, the oxidant gas manifold, or the coolant manifold, and serves to supply or discharge a fluid (a fuel gas, an oxidant gas, or a coolant). A liquid supply pipe or a liquid discharge pipe is connected to the fluid manifold member. The fluid manifold member is typically made of a resin. Therefore, there is a problem in that, for example, if an external load is applied to the fuel cell stack, the fluid manifold member is likely to become damaged due to a stress generated in the fluid manifold member.

For example, Japanese Unexamined Patent Application Publication No. 2011-065869 discloses a fuel cell stack for solving the problem. The fuel cell stack has a pipe connection structure for connecting a fluid manifold to an external pipe. The pipe connection structure is disposed on at least one of end plates and includes a resin manifold member (fluid manifold member) connected to the fluid manifold and a pipe connection portion, which is formed on the resin manifold member and to which the external pipe is connected.

A breakable portion, which becomes broken first when a load is applied from the outside, is formed between the resin manifold member and the pipe connection portion so as to be located below an electric power output terminal, which protrudes from the end plate.

Thus, it is possible to cause the resin manifold member to be broken at a desired position without fail when a load is applied from the outside, and it is possible to reduce the probability that the electric power output terminal becomes covered with a liquid.

SUMMARY OF THE INVENTION

According to one aspect of the present invention, a fuel cell stack includes a stack of fuel cells, a pair of end plates, a fluid manifold member, and a protrusion. Each of the fuel cells generates electric power by an electrochemical reaction between a fuel gas and an oxidant gas. The pair of end plates are respectively disposed at ends of the stack of fuel cells in a stacking direction. The fluid manifold member is disposed on at least one of the end plates. The fluid manifold member allows a fluid to flow through the fuel cells. The fluid is one of a coolant, a fuel gas, and an oxidant gas. The protrusion is disposed around a joint region at which the fluid manifold member is joined to the at least one of the end plates. The protrusion protrudes outward in the stacking direction.

According to another aspect of the present invention, a fuel cell stack includes a stack of fuel cells, a first end plate, a second end plate, a fluid manifold member, and a protrusion. In the stack of fuel cells, the fuel cells are stacked in a stacking direction. The stack of fuel cells has a first end and a second end opposite to the first end in the stacking direction. Each of the fuel cells is configured to generate electric power via an electrochemical reaction between a fuel gas and an oxidant gas. The first end plate is disposed on the first end of the stack of fuel cells in the stacking direction. The second end plate is disposed on the second end of the stack of fuel cells in the stacking direction. The fluid manifold member is disposed on at least one of the first and second end plates. The fluid manifold member allows a fluid to flow through the fuel cells. The fluid includes at least one of a coolant, a fuel gas, and an oxidant gas. The protrusion is disposed around a joint region at which the fluid manifold member is joined to the at least one of the first and second end plates. The protrusion protrudes outward in the stacking direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
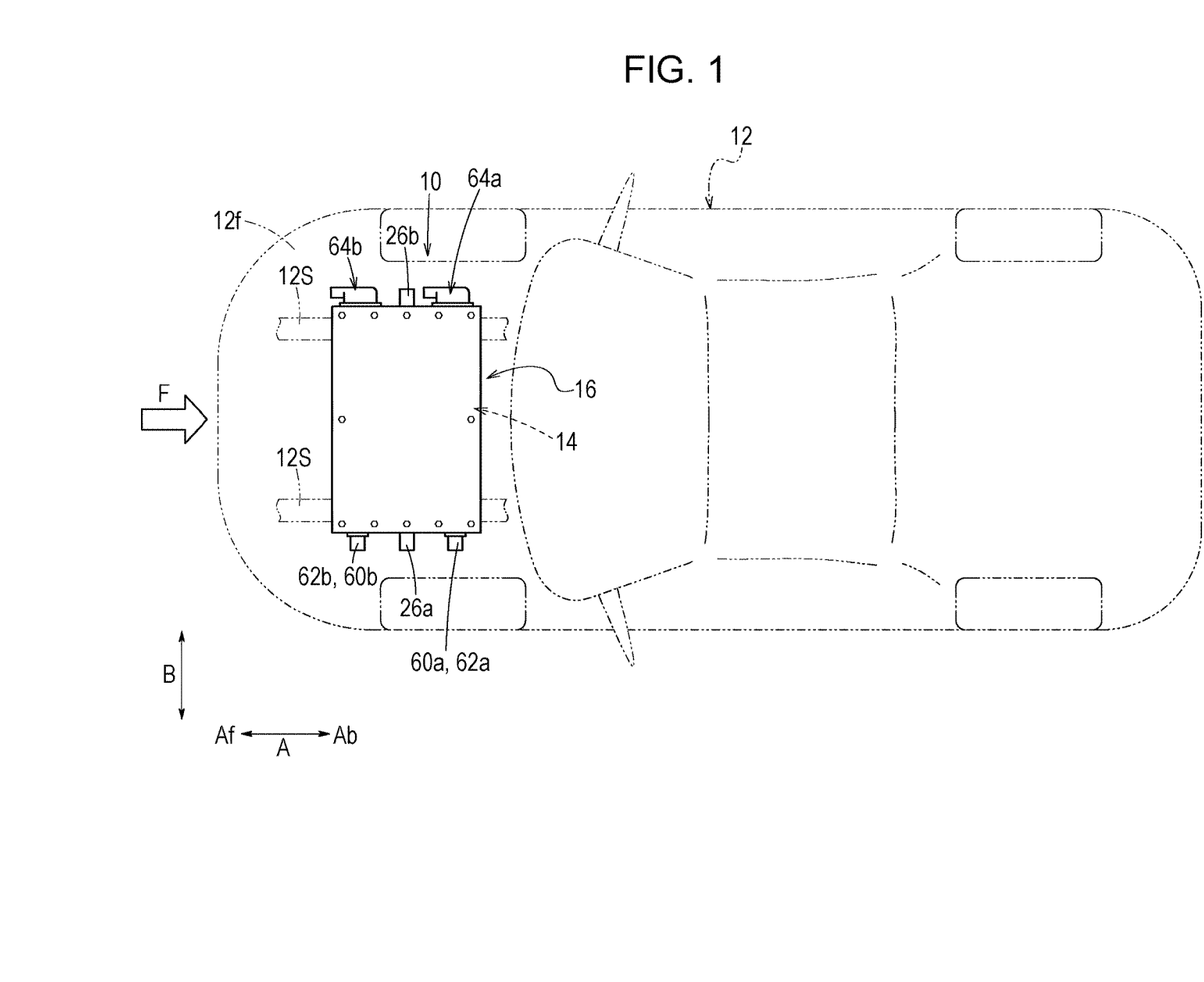
FIG. 1 is a schematic plan view of a fuel cell electric automobile in which a fuel cell stack according to a first embodiment is mounted.

As illustrated in FIG. 1, a fuel cell stack 10 according to a first embodiment is mounted in a front box 12f (so-called motor room) of a fuel cell electric automobile 12 (fuel cell vehicle).

Figure 2:
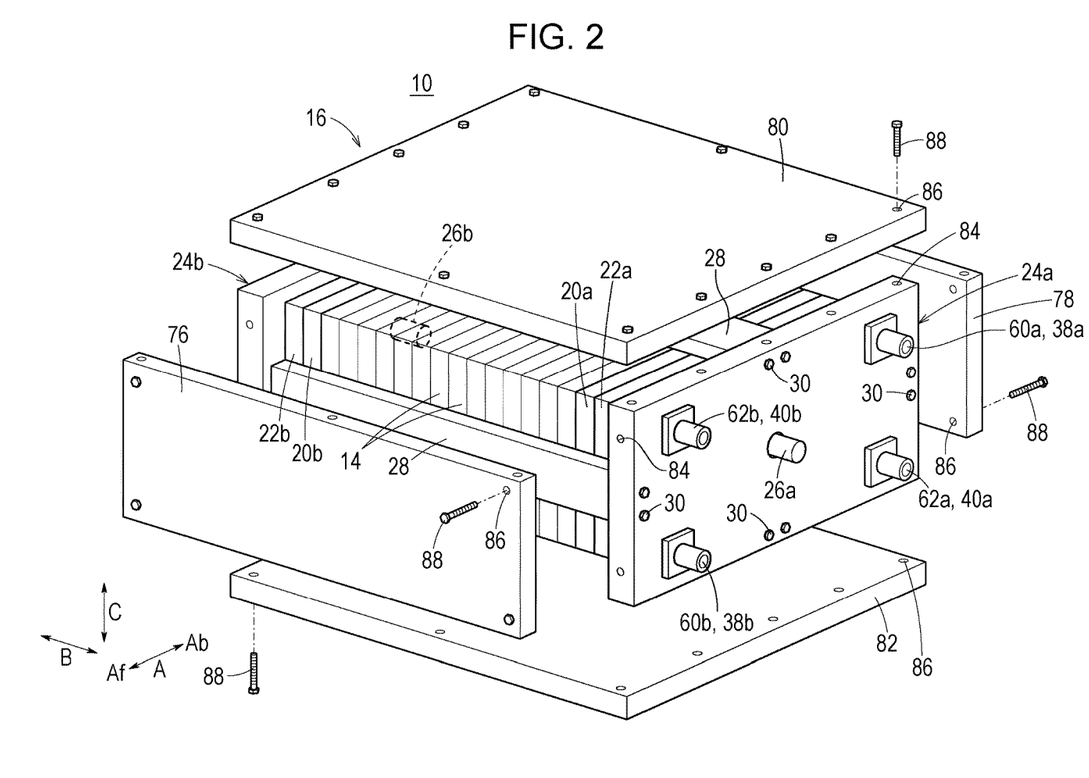
FIG. 2 is a partially exploded perspective view of a casing that contains the fuel cell stack.
Figure 3:
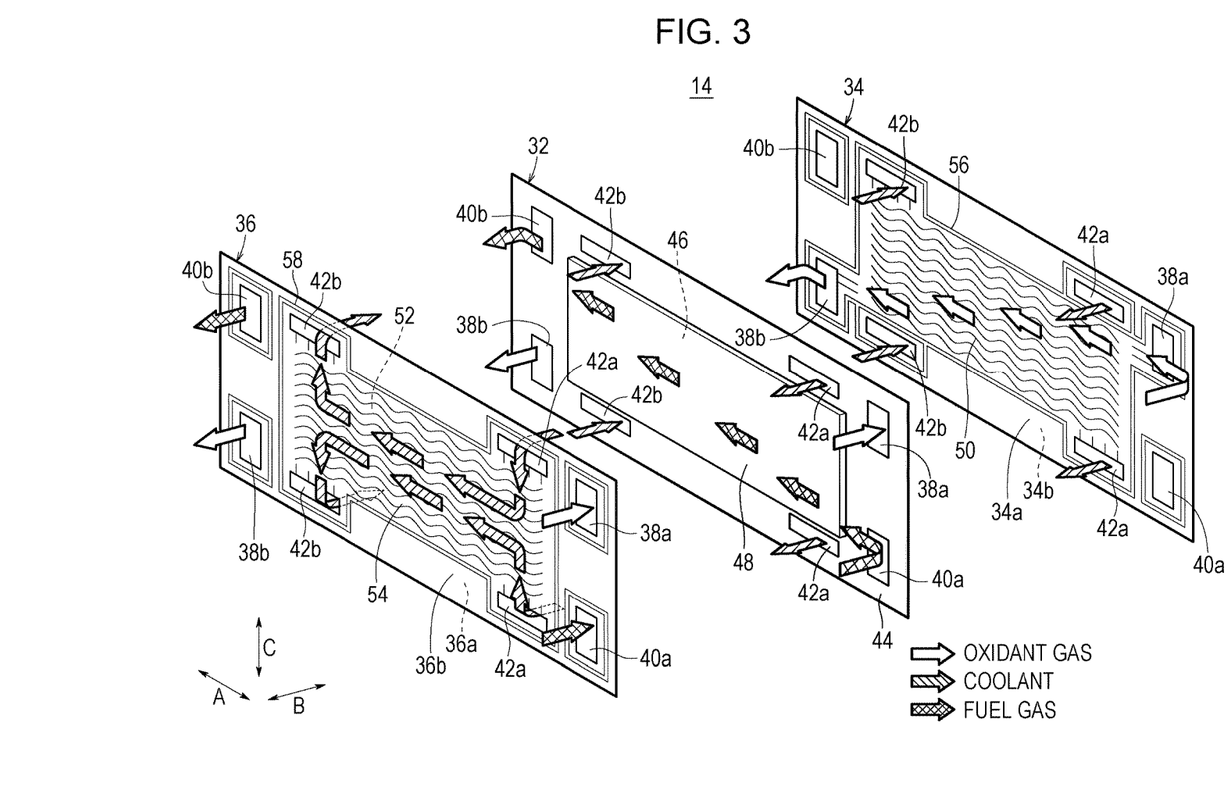
FIG. 3 is an exploded perspective view of a fuel cell of the fuel cell stack.

The fuel cell stack 10 includes a stack of fuel cells 14 and a casing 16 that contains the fuel cells 14 (see FIGS. 1 to 3). As illustrated in FIG. 2, the fuel cells 14 are arranged so that electrode surfaces thereof extend vertically and are stacked in the vehicle-width direction (direction of arrow B), which crosses the vehicle-length direction (vehicle-travelling direction) of the fuel cell electric automobile 12 (direction of arrow A).

As illustrated in FIG. 1, a pair of body frames 12S (vehicle frames) extend in the direction of arrow A in the front box 12f. The fuel cell stack 10 is mounted on the body frame 12S. It is not necessary that the fuel cell stack 10 be disposed in the front box 12f. Alternatively, for example, the fuel cell stack 10 may be disposed below a central part of the floor of the vehicle or near a rear trunk.

As illustrated in FIG. 2, at one end of the stack of fuel cells 14 in the stacking direction, a first terminal plate 20a, a first insulation plate 22a, and a first end plate 24a are sequentially arranged outward. At the other end of the stack of fuel cells 14 in the stacking direction, a second terminal plate 20b, a second insulation plate 22b, and a second end plate 24b are sequentially arranged outward.

The first end plate 24a has a horizontally-elongated (rectangular) shape. A first electric power output terminal 26a, which is connected to the first terminal plate 20a, extends outward from a substantially central part (which may be displaced from the center) of the first end plate 24a. The second end plate 24b has a horizontally-elongated (rectangular) shape. A second electric power output terminal 26b, which is connected to the second terminal plate 20b, extends outward from a substantially central part of the second end plate 24b.

Connection bars 28 are disposed between central parts of end portions of inner surfaces of the first end plate 24a and the second end plate 24b. Each of the connection bars 28 has a certain length corresponding to the distance between the central parts of the end portions. Ends of the connection bars 28 are fixed to the first and second end plates 24a and 24b with screws 30 so as to apply a clamping load to the stack of fuel cells 14 in the stacking direction (direction of arrow B).

As illustrated in FIG. 3, each of the fuel cells 14 includes a membrane electrode assembly 32, and a first metal separator 34 and a second metal separator 36 sandwiching the membrane electrode assembly 32 therebetween.

Each of the first metal separator 34 and the second metal separator 36 is made from, for example, a steel plate, a stainless steel plate, an aluminum plate, a galvanized steel plate, or any of such metal plates whose surface is anti-corrosive coated. Each of the first metal separator 34 and the second metal separator 36, which is made by press-forming a thin metal plate, has a rectangular shape in plan view and an undulating shape in a cross-sectional view. Instead of the first metal separator 34 and the second metal separator 36, for example, carbon separators may be used.

Each of the first metal separator 34 and the second metal separator 36 has a horizontally elongated rectangular shape having a long side extending in a horizontal direction (direction of arrow A) and a short side extending in the direction of gravity (direction of arrow C). Alternatively, the first and second metal separators 34 and 36 may have a short side extending in the horizontal direction and a long side extending in the direction of gravity.

An oxidant gas inlet manifold 38a and a fuel gas inlet manifold 40a are formed in the fuel cell 14 so as to extend in the direction of arrow B through one end portion of the fuel cell 14 in the longitudinal direction (direction of arrow A). An oxidant gas, such as an oxygen-containing gas, is supplied through the oxidant gas inlet manifold 38a. A fuel gas, such as a hydrogen-containing gas, is supplied through the fuel gas inlet manifold 40a.

A fuel gas outlet manifold 40b and an oxidant gas outlet manifold 38b are formed in the fuel cell 14 so as to extend in the direction of arrow B through the other end portion of the fuel cell 14 in the longitudinal direction. The fuel gas is discharged through the fuel gas outlet manifold 40b. The oxidant gas is discharged through the oxidant gas outlet manifold 38b.

A pair of coolant inlet manifolds 42a are formed in the fuel cell 14 in end portions of the fuel cell 14 in the transversal direction (direction of arrow C) on one side of the fuel cell 14 (near one end in the horizontal direction), that is, on a side adjacent to the oxidant gas inlet manifold 38a and the fuel gas inlet manifold 40a. The pair of coolant inlet manifolds 42a, through which a coolant is supplied, extend in the direction of arrow B and are disposed at opposing upper and lower end portions of the fuel cell 14. A pair of coolant outlet manifolds 42b are formed in the fuel cell 14 in end portions of the fuel cell 14 in the transversal direction on the other side of the fuel cell 14 (near the other end in the horizontal direction), that is, on a side adjacent to the fuel gas outlet manifold 40b and the oxidant gas outlet manifold 38b. The pair of coolant outlet manifolds 42b, through which a coolant is discharged, extend in the direction of arrow B and are disposed at opposing upper and lower end portions of the fuel cell 14.

The membrane electrode assembly 32 includes a solid polymer electrolyte membrane 44, and a cathode electrode 46 and an anode electrode 48 sandwiching the solid polymer electrolyte membrane 44 therebetween. The solid polymer electrolyte membrane 44 is, for example, a thin film that is made of perfluorosulfonic acid copolymers and soaked with water.

The cathode electrode 46 and the anode electrode 48 each include a gas diffusion layer (not shown) and an electrode catalyst layer (not shown). The gas diffusion layer is made of carbon paper or the like. The electrode catalyst layer is formed by uniformly coating a surface of the gas diffusion layer with porous carbon particles whose surfaces support a platinum alloy. The electrode catalyst layers are disposed on both sides of the solid polymer electrolyte membrane 44.

An oxidant gas channel 50, through which the oxidant gas inlet manifold 38a is connected to the oxidant gas outlet manifold 38b, is formed on a surface 34a of the first metal separator 34 facing the membrane electrode assembly 32. The oxidant gas channel 50 includes a plurality of wave-shaped channel grooves (or linear channel grooves) extending in the direction of arrow A.

A fuel gas channel 52, through which the fuel gas inlet manifold 40a is connected to the fuel gas outlet manifold 40b, is formed on a surface 36a of the second metal separator 36 facing the membrane electrode assembly 32. The fuel gas channel 52 includes a plurality of wave-shaped channel grooves (or linear channel grooves) extending in the direction of arrow A.

A coolant channel 54, through which the coolant inlet manifolds 42a are connected to the coolant outlet manifolds 42b, is formed between a surface 36b of the second metal separator 36 of the fuel cell 14 and a surface 34b of the first metal separator 34 of an adjacent fuel cell 14. The coolant channel 54, which extends in the horizontal direction, allows the coolant to flow over the entire area corresponding to the electrodes of the membrane electrode assembly 32.

A first sealing member 56 is integrally formed on the surfaces 34a and 34b of the first metal separator 34 so as to surround the outer periphery of the first metal separator 34. A second sealing member 58 is integrally formed on the surfaces 36a and 36b of the second metal separator 36 so as to surround the outer periphery of the second metal separator 36.

Each of the first sealing member 56 and the second sealing member 58 is made from an elastic material such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber.

As illustrated in FIG. 2, an oxidant gas inlet manifold member 60a, an oxidant gas outlet manifold member 60b, a fuel gas inlet manifold member 62a, and a fuel gas outlet manifold member 62b are attached to the first end plate 24a. The oxidant gas inlet manifold member 60a and the oxidant gas outlet manifold member 60b are respectively connected to the oxidant gas inlet manifold 38a and the oxidant gas outlet manifold 38b. The fuel gas inlet manifold member 62a and the fuel gas outlet manifold member 62b are respectively connected to the fuel gas inlet manifold 40a and the fuel gas outlet manifold 40b.

Figure 4:
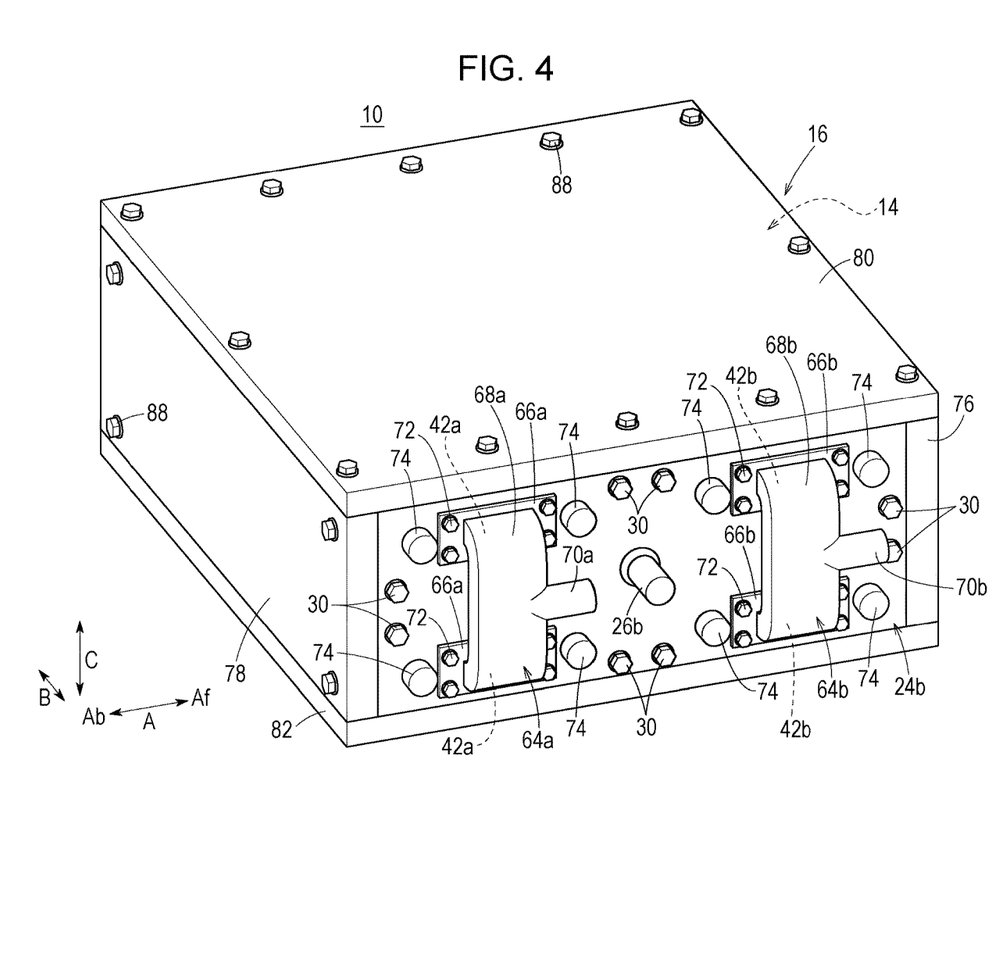
FIG. 4 is a perspective view showing a side of the fuel cell stack on which coolant manifold members are disposed.

As illustrated in FIG. 4, a coolant inlet manifold member 64a (fluid manifold member) is attached to the second end plate 24b. The coolant inlet manifold member 64a, which is made of a resin, is connected to the pair of coolant inlet manifolds 42a. A coolant outlet manifold member 64b (fluid manifold member) is attached to the second end plate 24b. The coolant outlet manifold member 64b, which is made of a resin, is connected to the pair of coolant outlet manifolds 42b.

The coolant inlet manifold member 64a includes an inlet body 68a and upper and lower flange portions 66a, which are integrated with the inlet body 68a. The upper and lower flange portions 66a are respectively connected to the upper and lower coolant inlet manifolds 42a. An inlet pipe 70a is connected to a central part of the inlet body 68a. Each of the flange portions 66a is fixed to the second end plate 24b by using a plurality of bolts 72.

The coolant outlet manifold member 64b includes an outlet body 68b and upper and lower flange portions 66b, which are integrated with the outlet body 68b. The upper and lower flange portions 66b are respectively connected to the upper and the lower one of the coolant outlet manifolds 42b. An outlet pipe 70b is connected to a central part of the outlet body 68b. Each of the flange portions 66b is fixed to the second end plate 24b by using a plurality of bolts 72.

A plurality of protrusions 74 protrude from the second end plate 24b outward in the stacking direction. The protrusions 74 are disposed around joint regions at which the coolant inlet manifold member 64a and the coolant outlet manifold member 64b are joined to the second end plate 24b.

The protrusions 74 are integrally formed with the second end plate 24b so as to protrude outward in the stacking direction. Each of the protrusions 74 has a cylindrical shape. Alternatively, each of the protrusions may have a conical shape, a prismatic shape, or any appropriate shape. The protrusions 74 may be disposed at any positions as long as the protrusions 74 enable the positions at which the coolant inlet manifold member 64a and the coolant outlet manifold member 64b become broken to be controlled. Each of the protrusions 74 may have an annular shape or an arc-like shape that surrounds a corresponding one of the coolant inlet manifold member 64a and the coolant outlet manifold member 64b.

Figure 5:
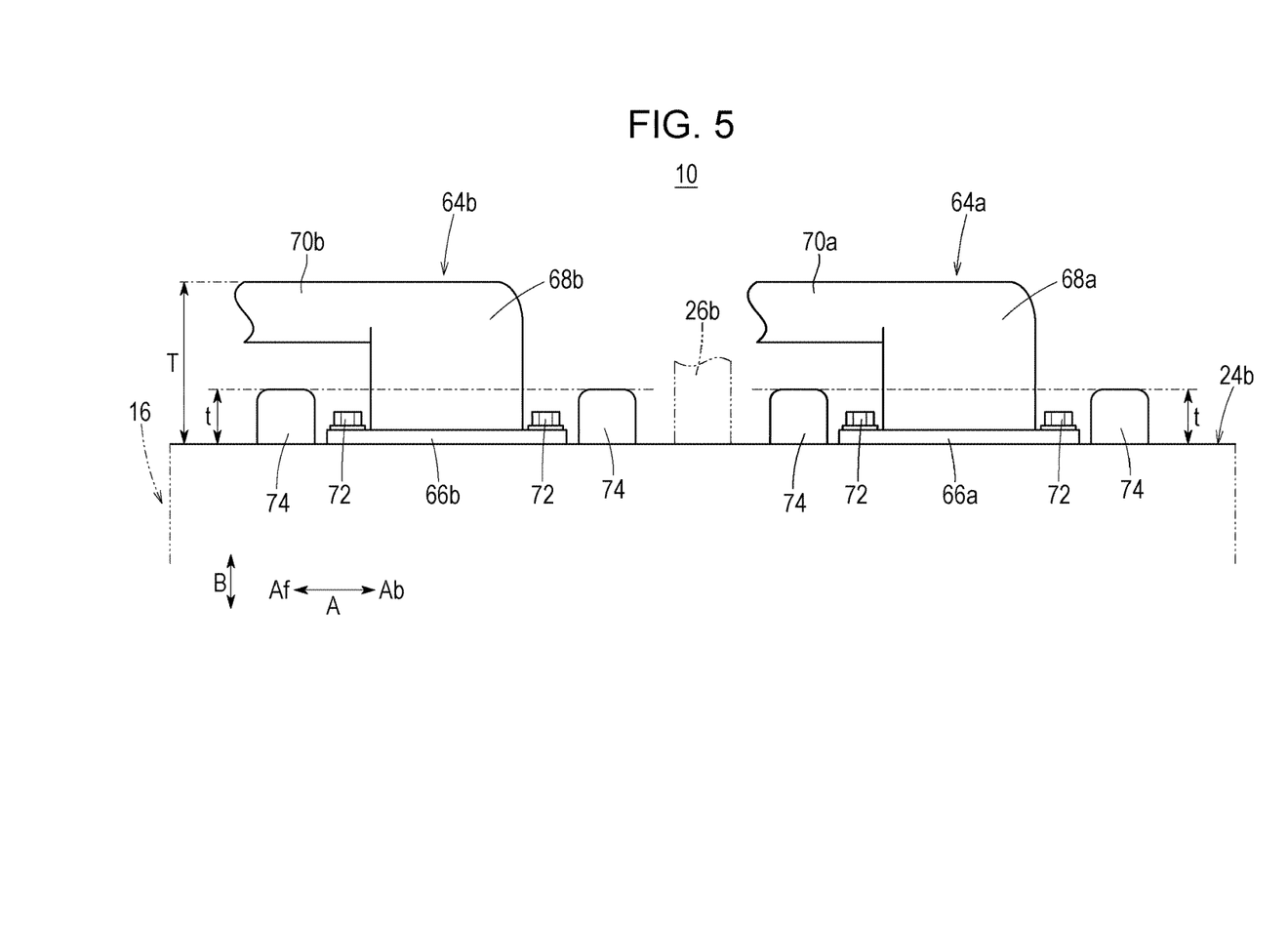
FIG. 5 is a plan view showing the side of the fuel cell stack on which the coolant manifold members are disposed.

As illustrated in FIG. 5, each of the protrusions 74 has a height t (protruding length). For example, when an external load F is applied to the fuel cell electric automobile 12, the coolant inlet manifold member 64a and the coolant outlet manifold member 64b may collide with other parts of the fuel cell electric automobile 12 and may become broken. The height t of each of the protrusions 74 is set so that, in such a case, the positions (the height) at which the coolant inlet manifold member 64a and the coolant outlet manifold member 64b become broken can be controlled and a short circuit due to leakage of a coolant can be prevented. To be specific, a relationship $T>t$ holds, where T is the maximum height of the coolant inlet manifold member 64a.

As illustrated in FIGS. 2 and 4, two sides (surfaces) of the casing 16 at ends in the vehicle-width direction (direction of arrow B) are formed by the first end plate 24a and the second end plate 24b. Two sides (surfaces) of the casing 16 at ends in the vehicle-length direction (direction of arrow A) are formed by a front side panel 76 and a back side panel 78, which have horizontally-elongated rectangular plate-like shapes. Two sides (surfaces) of the casing 16 at ends in the vehicle-height direction (direction of arrow C) are formed by an upper side panel 80 and a lower side panel 82. The upper side panel 80 and the lower side panel 82 have horizontally-elongated rectangular plate-like shapes.

The front side panel 76, the back side panel 78, the upper side panel 80, and the lower side panel 82 are fixed to the first end plate 24a and the second end plate 24b by inserting screws 88 through holes 86 into threaded holes 84, which are formed in the first end plate 24a and the second end plate 24b. The lower side panel 82 is fixed to the body frame 12S by using bolts or the like.

The operation of the fuel cell stack 10 having the aforementioned structure will be described.

Referring FIG. 2, first, an oxidant gas, such as an oxygen-containing gas, is supplied from the oxidant gas inlet manifold member 60a of the first end plate 24a to the oxidant gas inlet manifold 38a. A fuel gas, such as a hydrogen-containing gas, is supplied from the fuel gas inlet manifold member 62a of the first end plate 24a to the fuel gas inlet manifold 40a.

Referring to FIG. 4, a coolant, such as pure water, ethylene glycol, or an oil, is supplied from the coolant inlet manifold member 64a of the second end plate 24b to the pair of coolant inlet manifolds 42a.

As illustrated in FIG. 3, the oxidant gas is introduced from the oxidant gas inlet manifold 38a into the oxidant gas channel 50 of the first metal separator 34. The oxidant gas flows along the oxidant gas channel 50 in the direction of arrow A, and is supplied to the cathode electrode 46 of the membrane electrode assembly 32.

The fuel gas is supplied from the fuel gas inlet manifold 40a to the fuel gas channel 52 of the second metal separator 36. The fuel gas flows along the fuel gas channel 52 in the direction of arrow A, and is supplied to the anode electrode 48 of the membrane electrode assembly 32.

Accordingly, in the membrane electrode assembly 32, the oxidant gas supplied to the cathode electrode 46 and the fuel gas supplied to the anode electrode 48 are consumed in electrochemical reactions in the electrode catalyst layers, thus generating electric power.

Next, the oxidant gas, which has been supplied to the cathode electrode 46 of the membrane electrode assembly 32 and consumed, is discharged along the oxidant gas outlet manifold 38b in the direction of arrow B. The fuel gas, which has been supplied to the anode electrode 48 of the membrane electrode assembly 32 and consumed, is discharged along the fuel gas outlet manifold 40b in the direction of arrow B.

The coolant supplied to the pair of coolant inlet manifolds 42a is introduced into the coolant channel 54 between the first metal separator 34 and the second metal separator 36. The coolant temporarily flows inward in the direction of arrow C, then flows in the direction of arrow A, and cools the membrane electrode assembly 32. Then, the coolant flows outward in the direction of arrow C, and is discharged along the pair of coolant outlet manifolds 42b in the direction of arrow B.

As described above, the fuel cell electric automobile 12 runs on electric power supplied from the fuel cell stack 10 to a traction motor (not shown). If an external load F is applied to the fuel cell electric automobile 12 in the direction of arrow Ab (backward in the vehicle-length direction) as shown in FIG. 1, a front portion of the fuel cell electric automobile 12 is likely to become dented. Accordingly, the fuel cell stack 10 may be moved in the direction of arrow Ab and may collide with another part of the fuel cell electric automobile 12 (for example, the brake system).

In the first embodiment, as illustrated in FIG. 4, the plurality of protrusion 74, which protrude outward from the second end plate 24b in the stacking direction, are disposed in the vicinities of joint regions at which the coolant inlet manifold member 64a and the coolant outlet manifold member 64b are joined to the second end plate 24b.

As illustrated in FIG. 5, because each of the protrusions 74 has the height t, the positions at which the coolant inlet manifold member 64a and the coolant outlet manifold member 64b become broken are controlled to be at a predetermined height. Therefore, if the fuel cell stack 10 is moved and, for example, the coolant inlet manifold member 64a collides with another part of the fuel cell electric automobile 12, the protrusions 74 prevent the coolant inlet manifold member 64a from being broken in the vicinity of the joint region.

Figure 6:
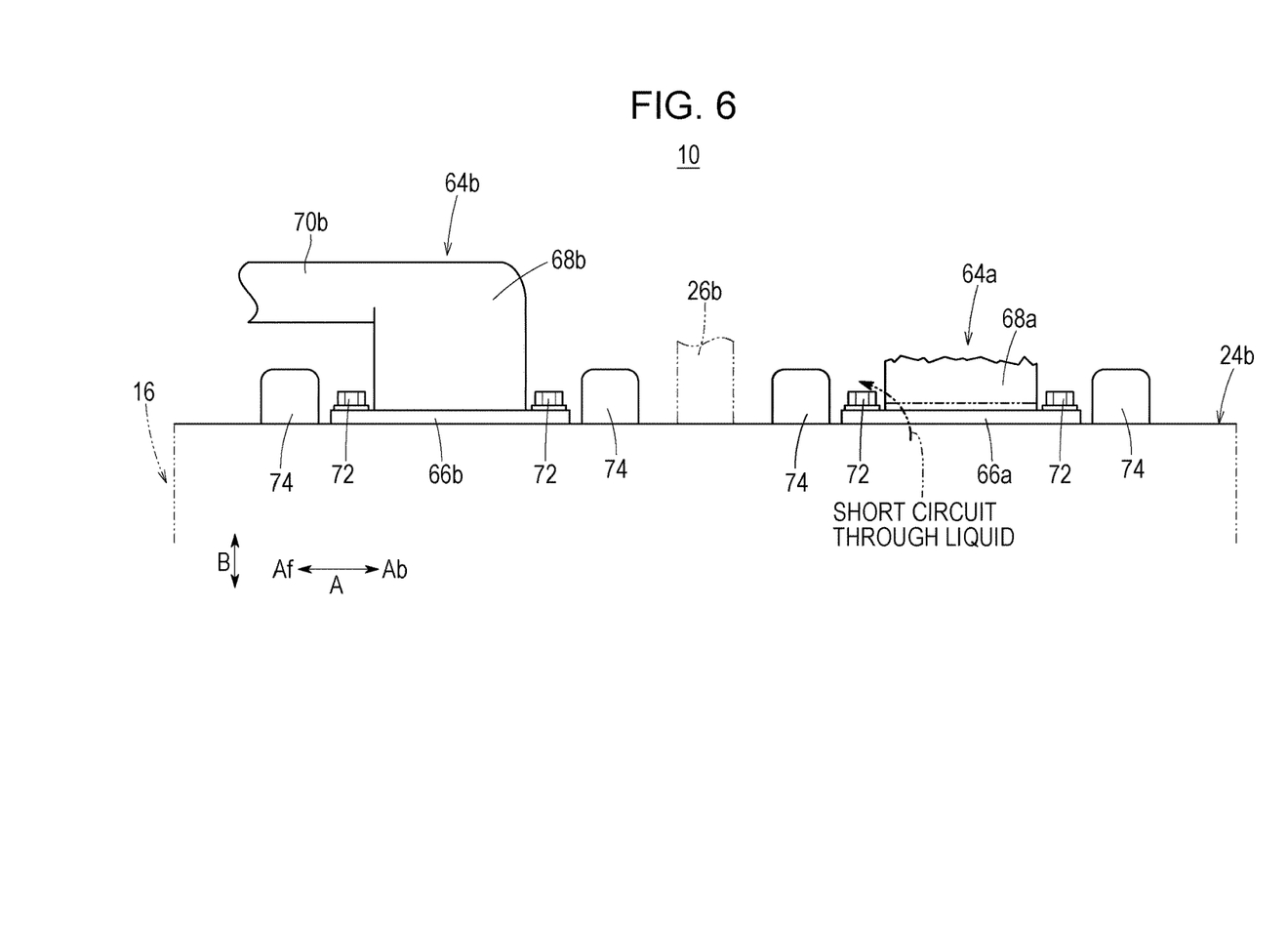
FIG. 6 is a plan view showing the side of the fuel cell stack on which the coolant manifold members, one of which is broken, are disposed.

Referring to FIG. 6, if a base portion of the coolant inlet manifold member 64a becomes broken (as shown by a two-dot chain line in FIG. 6), an electric current may flow through a coolant remaining in the coolant inlet manifold member 64a. In contrast, according to the first embodiment, the remaining broken portion of the coolant inlet manifold member 64a protrudes outward from the joint region, and therefore flow of an electric current through a coolant remaining inside of the coolant inlet manifold member 64a can be prevented without fail and the insulation resistance can be maintained. Likewise, if the coolant outlet manifold member 64b collides with another part of the fuel cell electric automobile 12, the protrusions 74 prevent the coolant outlet manifold member 64b from being broken in the vicinity of the joint regions.

Thus, it is possible to control the way in which the coolant inlet manifold member 64a and the coolant outlet manifold member 64b become broken with a simple and economical structure. Therefore, an advantage is obtained in that the insulation resistance can be maintained and the probability of the occurrence of a short circuit through a liquid can be reduced.

Figure 7:
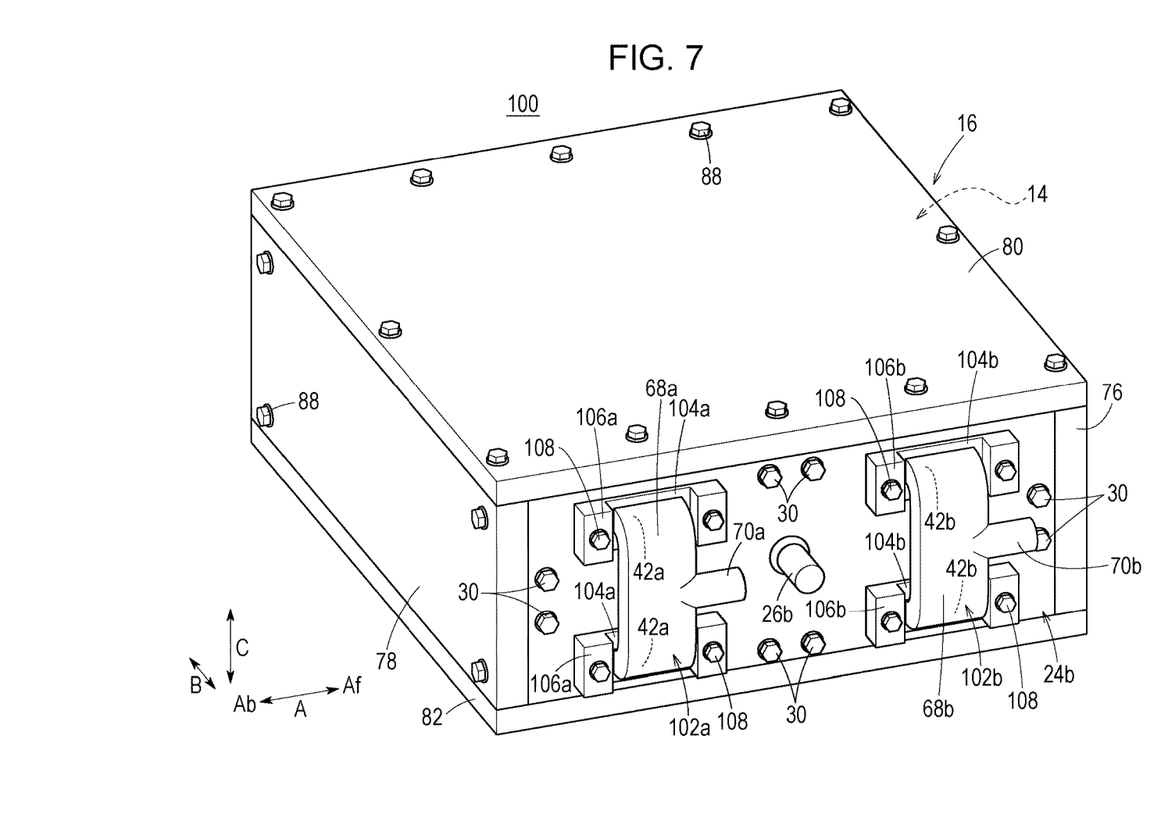
FIG. 7 is a perspective view of a fuel cell stack according to a second embodiment.

FIG. 7 is a perspective view of a fuel cell stack 100 according to a second embodiment. Elements that are the same as those of the fuel cell stack 10 according to the first embodiment will be denoted by the same numerals and descriptions of such elements will be omitted. The same applies to third and fourth embodiments described below.

The fuel cell stack 100 includes a coolant inlet manifold member 102a (fluid manifold member), which is made of a resin, and a coolant outlet manifold member 102b (fluid manifold member), which is made of a resin. The coolant inlet manifold member 102a is connected to the pair of coolant inlet manifolds 42a, and the coolant outlet manifold member 102b is connected to the pair of coolant outlet manifolds 42b.

The coolant inlet manifold member 102a includes upper and lower flange portions 104a, which are respectively connected to the upper and lower coolant inlet manifolds 42a. The flange portions 104a are integrated with the inlet body 68a. Each of the flange portions 104a includes protrusions 106a that protrude outward in the stacking direction.

Figure 8:
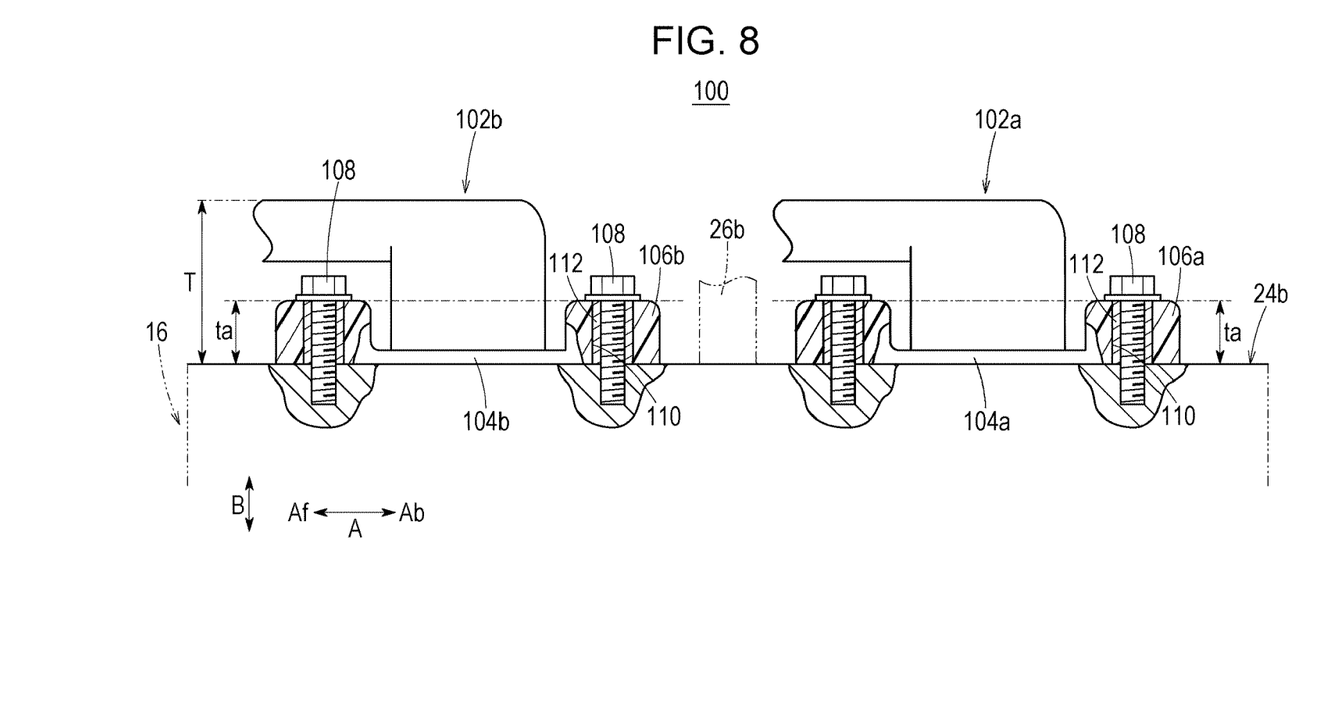
FIG. 8 is a plan view showing a side of the fuel cell stack on which the coolant manifold members are disposed.

The protrusions 106a are formed at both ends of each of the flange portions 104a. Alternatively, a single protrusion may be formed so as to surround each of the flange portions 104a. The protrusions 106a are fixed to the second end plate 24b by using bolts 108. As illustrated in FIG. 8, holes 110 are formed in the flange portion 104a, and collar members 112 are inserted into the holes 110.

The protrusions 106a are fastened to the second end plate 24b by inserting the bolts 108 into the collar members 112 and screwing ends of the bolts 108 into the second end plate 24b. The height ta of each of the protrusions 106a (see FIG. 8) is set so that the position at which the coolant inlet manifold member 102a becomes broken can be controlled to be at a predetermined height (T>ta).

The coolant outlet manifold member 102b includes upper and lower flange portions 104b, which are respectively connected to the upper and lower coolant outlet manifolds 42b. The flange portions 104b are integrated with the outlet body 68b. Each of the flange portions 104b includes protrusions 106b that protrude outward in the stacking direction.

The protrusions 106b are formed at both ends of each of the flange portions 104b. Alternatively, a single protrusion may be formed so as to surround each of the flange portions 104b. The protrusions 106b are fixed to the second end plate 24b by using bolts 108. As illustrated in FIG. 8, because the elements for fastening the flange portions 104b to the second end plate 24b are the same as those for fastening the flange portions 104a, such elements are denoted by the same numerals and descriptions thereof will be omitted.

In the second embodiment, the coolant inlet manifold member 102a and the coolant outlet manifold member 102b respectively include the protrusions 106a and protrusions 106b, which protrude outward in the stacking direction. Thus, it is possible to control the way in which the coolant inlet manifold member 102a and the coolant outlet manifold member 102b become broken with a simple and economical structure. Therefore, as with the first embodiment, an advantage is obtained in that the insulation resistance can be maintained and the probability of the occurrence of a short circuit through a liquid can be reduced.

Figure 9:
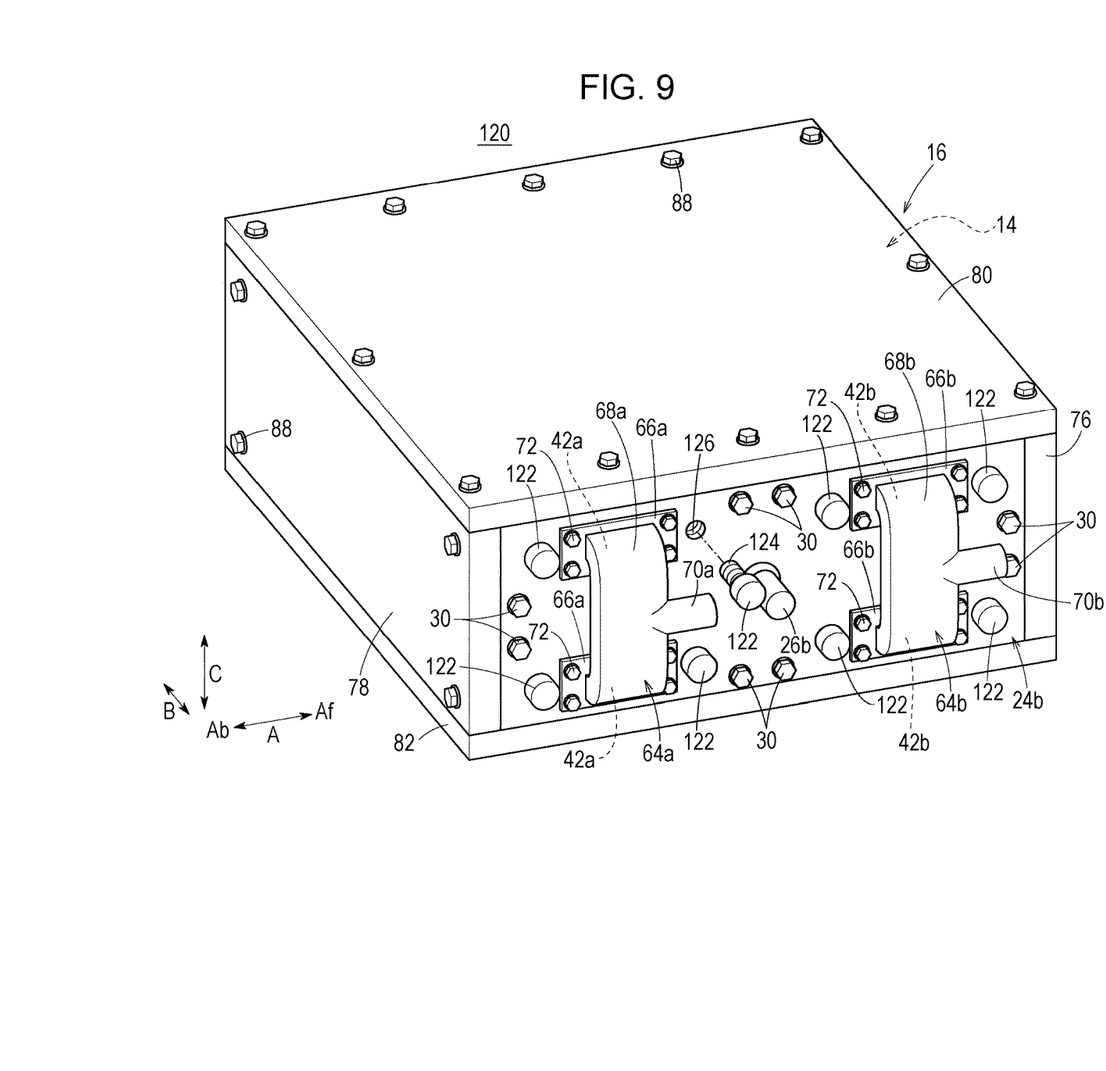
FIG. 9 is a perspective view of a fuel cell stack according to a third embodiment.

FIG. 9 is a perspective view of a fuel cell stack 120 according to a third embodiment.

The fuel cell stack 120 includes protrusions 122, instead of the protrusions 74 of the first embodiment. The protrusions 122 each have a threaded portion 124 at an end thereof. Threaded holes 126 are formed in the second end plate 24b. Each of the protrusions 122 is formed independently from the second end plate 24b and is attached to the second end plate 24b by screwing the threaded portion 124 into the threaded hole 126.

Accordingly, the third embodiment has substantially the same structure as the first embodiment, and provides the same advantage as the first embodiment.

Figure 10:
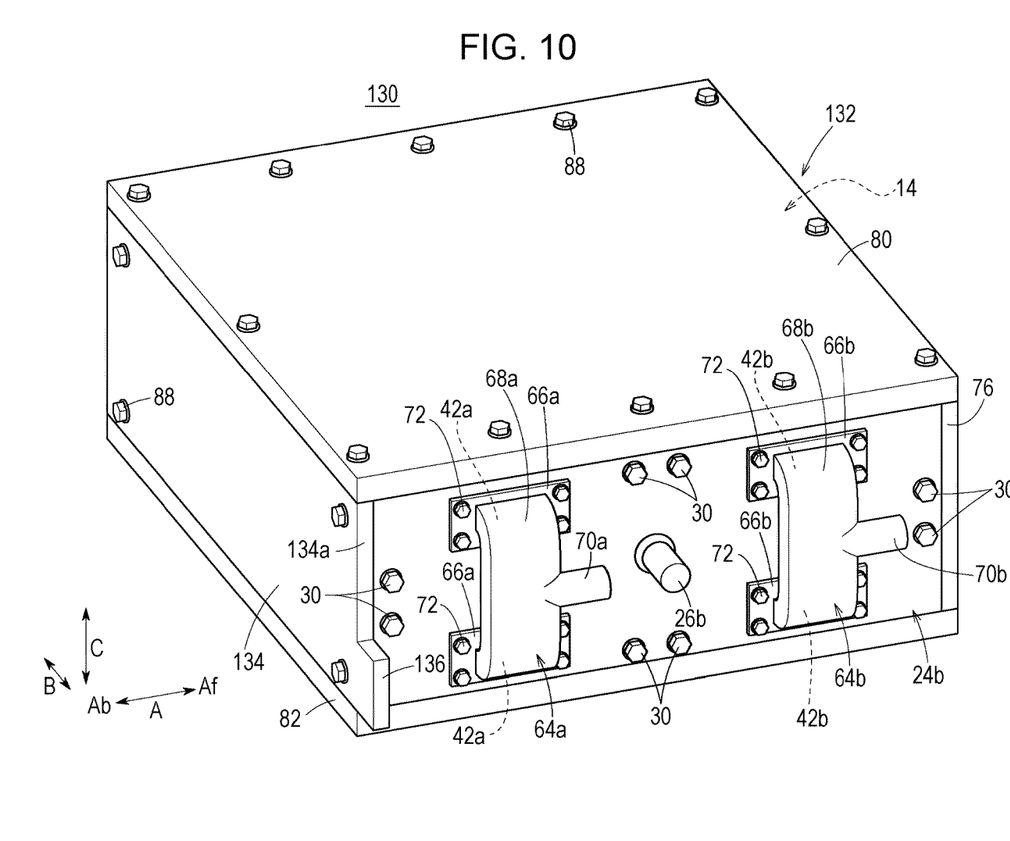
FIG. 10 is a perspective view of a fuel cell stack according to a fourth embodiment.

FIG. 10 is a perspective view of a fuel cell stack 130 according to a fourth embodiment.

The fuel cell stack 130 includes a casing 132 that contains the fuel cells 14. The casing 132 has a back side panel 134 (plate member), instead of the back side panel 78 of the first embodiment. The back side panel 134 has a protrusion 136, which protrudes outward in the stacking direction from an end surface 134a adjacent to the second end plate 24b. The protrusion 136 may be integrally formed with the back side panel 134 (or may be an independent member attached to the back side panel 134). The protrusion 136 has a plate-like shape having a predetermined width in the direction of arrow C from the lower end of the back side panel 134. The protrusion 136 may extend over the entire width from the lower end to the upper end of the back side panel 134.

Figure 11:
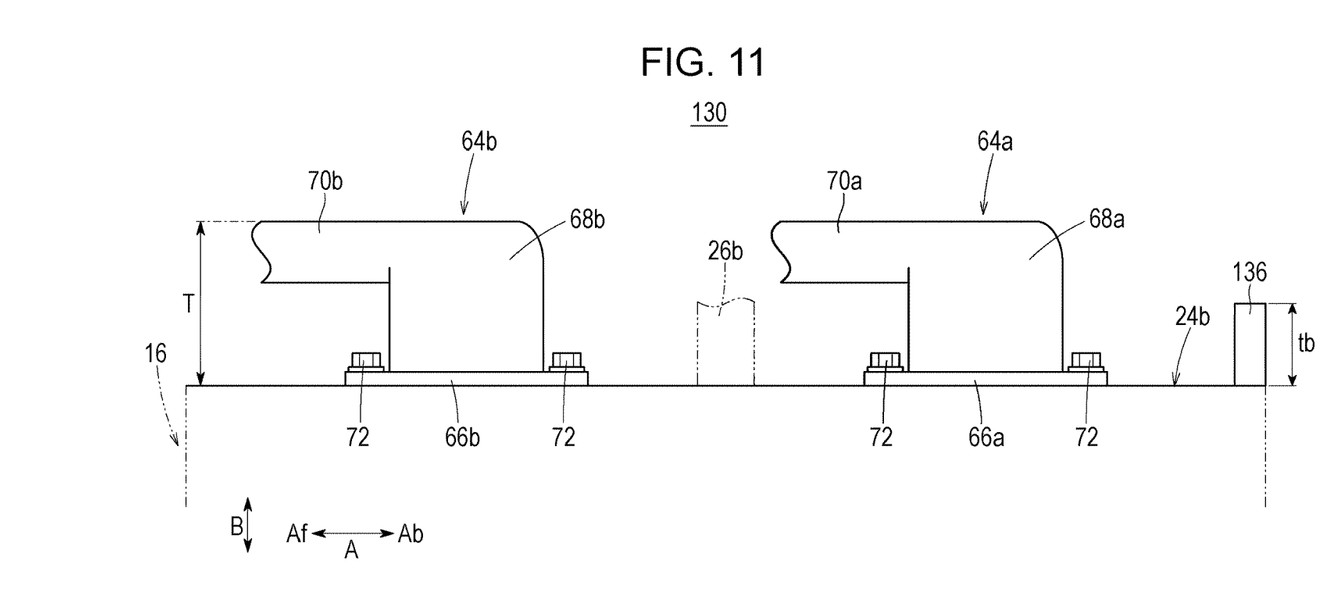
FIG. 11 is a plan view showing a side of the fuel cell stack on which the coolant manifold members are disposed.

As illustrated in FIG. 11, the protrusion 136 has a height tb (protruding length). The height tb of the protrusion 136 is set so that the position at which the coolant inlet manifold member 64a becomes broken can be controlled to be at a predetermined height (T>tb). The protrusion 136 may be formed on the front side panel 76 instead of the back side panel 134, or may be formed on each of the back side panel 134 and the front side panel 76.

Accordingly, the fourth embodiment has the same advantage as the first to third embodiments.

Each of the coolant inlet manifold members 64a and 102a and the coolant outlet manifold members 64b and 102b of the first to fourth embodiments is an example of a fluid manifold member. However, the fluid manifold member is not limited to any of these. The same structure can be used for a fluid manifold member for a fuel gas or an oxidant gas, instead of a coolant. In other words, the same structure can be used for the first end plate 24a.

According to the present disclosure, a fuel cell stack includes a stack of fuel cells, each of the fuel cells generating electric power by an electrochemical reaction between a fuel gas and an oxidant gas; and a pair of end plates respectively disposed at ends of the stack of fuel cells in a stacking direction.

The fuel cell stack further includes a fluid manifold member disposed on at least one of the end plates, the fluid manifold member allowing a fluid to flow through the fuel cells, the fluid being one of a coolant, a fuel gas, and an oxidant gas. The fuel cell stack further includes a protrusion disposed around a joint region at which the fluid manifold member is joined to the at least one of the end plates, the protrusion protruding outward in the stacking direction.

Preferably, in the fuel cell stack, the protrusion is formed so as to be integrated with or independent from the at least one of the end plates and so as to protrude outward from a surface of the at least one of the end plates in the stacking direction.

Preferably, in the fuel cell stack, the fluid manifold member includes a flange portion that is fixed to the at least one of the end plates, and the protrusion protrudes outward from the flange portion in the stacking direction.

Preferably, the fuel cell stack further includes a plate member fixed to the end plates, and the protrusion protrudes outward from an end surface of the plate member in the stacking direction, the end surface being located adjacent to the at least one of the end plates.

According to the present disclosure, a protrusion, which protrudes outward in the stacking direction, is disposed around a joint region at which the fluid manifold member is joined to the at least one of the end plates. Therefore, for example, when an external load is applied to the fluid manifold member, the protrusion, which protrudes outward from the joint region, prevents the fluid manifold member from being broken in the vicinity of the joint region. Accordingly, the remaining broken portion of the fluid manifold member protrudes outward from the joint region, and therefore a short circuit through a liquid remaining in the fluid manifold member can be prevented and the insulation resistance can be maintained.

Thus, it is possible to control the position at which the fluid manifold member becomes broken and to reduce the probability of the occurrence of a short circuit through a liquid with a simple and economical structure.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack comprising:
   a stack of fuel cells, each of the fuel cells generating electric power by an electrochemical reaction between a fuel gas and an oxidant gas;
   a pair of end plates respectively disposed at ends of the stack of fuel cells in a stacking direction;
   a fluid manifold member directly contacts and is directly mounted to an outer surface of at least one of the end plates, the fluid manifold member including a manifold body mounted to the outer surface of and protruding outward beyond the at least one of the end plates in the stacking direction and having at least two fluid passages fluidly connected to a single fluid passage, the fluid manifold member allowing a fluid to flow through the fuel cells, the fluid being one of a coolant, a fuel gas, and an oxidant gas;
   a protrusion disposed around a joint region at which the fluid manifold member is joined to the at least one of the end plates, the protrusion protruding outward beyond the at least one of the end plates in the stacking direction; and a pair of side panels directly fixed to the pair of end plates, the pair of side panels being arranged on opposite sides of the stack of fuel cells in a direction orthogonal to the stacking direction, wherein the protrusion is part of one side panel of the pair of side panels and the protrusion protrudes outward from an end surface of the one side panel in the stacking direction, the end surface being located adjacent to the at least one of the end plates, and wherein the protrusion is provided on only the one side panel of the pair of side panels such that no protrusion that protrudes in the stacking direction is provided on the other side panel of the pair of side panels.

2. A fuel cell stack comprising:
a stack of fuel cells, each of the fuel cells generating electric power by an electrochemical reaction between a fuel gas and an oxidant gas;
a pair of end plates respectively disposed at ends of the stack of fuel cells in a stacking direction; and
a fluid manifold member disposed on at least one of the end plates, the fluid manifold member allowing a fluid to flow through the fuel cells, the fluid being one of a coolant, a fuel gas, and an oxidant gas,
wherein the fluid manifold member includes a manifold body and a flange portion that is fixed to the at least one of the end plates, the flange portion being directly connected to the manifold body at a location,
wherein the flange portion includes a flange body formed with a protrusion as a single element, the protrusion directly contacts the flange body, the protrusion protrudes directly from the at least one of the end plates and protrudes outward in the stacking direction, and the protrusion extends away from the stack of fuel cells beyond the location at which the manifold body directly connects to the flange portion in the stacking direction,
wherein the flange portion that is fixed to the at least one of the end plates by a plurality of bolts, and
wherein a bolt of the plurality of bolts extends through the protrusion in the stacking direction.

3. The fuel cell stack according to claim 2,
wherein the protrusion protrudes outward in the stacking direction beyond the flange body.

4. A fuel cell stack comprising:
a stack of fuel cells, each of the fuel cells generating electric power by an electrochemical reaction between a fuel gas and an oxidant gas;
a pair of end plates respectively disposed at ends of the stack of fuel cells in a stacking direction; and
a fluid manifold member disposed on at least one of the end plates, the fluid manifold member allowing a fluid to flow through the fuel cells, the fluid being one of a coolant, a fuel gas, and an oxidant gas,
wherein the fluid manifold member includes a manifold body and a flange portion that is fixed to the at least one of the end plates, the flange portion being directly connected to the manifold body at a location,
wherein the flange portion includes a flange body formed with a protrusion as a single element, the protrusion directly contacts the flange body, the protrusion protrudes directly from the at least one of the end plates and protrudes outward in the stacking direction, and the protrusion extends away from the stack of fuel cells beyond the location at which the manifold body directly connects to the flange portion in the stacking direction,
wherein the protrusion protrudes outward in the stacking direction beyond the flange body,
wherein the flange portion that is fixed to the at least one of the end plates by a plurality of bolts, and
wherein a bolt of the plurality of bolts extends through the protrusion in the stacking direction.

5. The fuel cell stack according to claim 1,
wherein each side panel of the pair of side panels being directly fixed to both end plates of the pair of end plates.

6. The fuel cell stack according to claim 1,
wherein the other side panel of the pair of side panels has an end surface that does not protrude beyond the at least one of the end plates in the stacking direction.

* * * * *